United States Patent
Russell et al.

(10) Patent No.: US 10,793,649 B2
(45) Date of Patent: Oct. 6, 2020

(54) METHOD OF FORMING A MICROPHASE SEPARATED BLOCK COPOLYMER AND MICROPHASE SEPARATED BLOCK COPOLYMER

(71) Applicants: The University of Massachusetts, Boston, MA (US); The Research Foundation For The State University of New York, Amherst, NY (US)

(72) Inventors: Thomas P. Russell, Amherst, MA (US); Duk Man Yu, Amherst, MA (US); Javid Rzayev, Williamsville, NY (US); Jose Kenneth D. Mapas, Amherst, NY (US)

(73) Assignees: THE UNIVERSITY OF MASSACHUSETTS, Boston, MA (US); THE RESEARCH FOUNDATION FOR THE STATE UNIVERSITY OF NEW YORK, Amherst, NY (US)

( * ) Notice: Subject to any disclaimer, the term of this patent is extended or adjusted under 35 U.S.C. 154(b) by 133 days.

(21) Appl. No.: 16/179,078

(22) Filed: Nov. 2, 2018

(65) Prior Publication Data

US 2020/0024375 A1    Jan. 23, 2020

Related U.S. Application Data

(60) Provisional application No. 62/581,198, filed on Nov. 3, 2017.

(51) Int. Cl.
*C08F 6/26* (2006.01)

(52) U.S. Cl.
CPC ..................... *C08F 6/26* (2013.01)

(58) Field of Classification Search
CPC ...... C08F 6/26; C08F 8/12; C08F 6/00; C08F 293/00; C08F 293/005; C08F 297/00; C08F 297/02; C08F 297/06; C08F 2810/50; C08L 53/00
See application file for complete search history.

(56) References Cited

U.S. PATENT DOCUMENTS

| | | | |
|---|---|---|---|
| 7,521,094 B1 | 4/2009 | Cheng et al. | |
| 2011/0059299 A1 | 3/2011 | Kim et al. | |

OTHER PUBLICATIONS

Kwak, J. et al. Macromolecules vol. 50 pp. 6813-6818 (Aug. 2017) (Year: 2017).*
Kanimozhi, C. et al. ACS Macro Letters vol. 5 pp. 833-838 (Jun. 2016) (Year: 2016).*
Luo, Y. et al. Macromolecules vol. 48 pp. 3422-3430 (May 2015) (Year: 2015).*
Cheng, J. et al. Proceedings of SPIE vol. 8323 pp. 8323R1-8323R8 (Apr. 2012) (Year: 2012).*
Adamson, C., et al., "Glioblastoma Multiforme: A review of where we have been and where we are going", Expert Opin. Investig. Drugs 2009, 18 (8); pp. 1061-1083.
Arrowsmith, J. et al., "Antitumor Imidazotetrazines. 41. Conjugation of the Antitumor Agents Mitozolomide and Temozolomide to Peptides and Lexitropsins Bearing DNA Major and Minor Groove-Binding Structural Motifs", J. Med. Chem. 2002, 45; pp. 5458-5470.
Arrowsmith, J. et al., "Antitumour Imidazotetrazines. Part 39. Synthesis of bis(imidazotetrazine)s with saturated spacer groups.", J. Chem. Soc. Perkin Trans. 2000, 1; pp. 4432-4438.
Bang, J., et al., "Block Copolymer Nanolithography: Translation of Molecular Level Control to Nanoscale Patterns", Adv. Mater. 2009, 21, 4769-4792.
Bates, F. S., et al., "Block Copolymer Thermodynamics: Theory and Experiment", Annu. Rev. Phys. Chem. 1990, 41, 525-557.
Bates, F. S., et al., "Block Copolymers—Designer Soft Materials", Phys. Today 1999, 52, 32-38.
Berrocal, A. et al., "Extended-schedule dose-dense temozolomide in refractory gliomas", J. Neurooncol (2010) 96; pp. 417-422.
Borah, D., et al., "Sub-10 nm Feature Size PS-b-PDMS Block Copolymer Structures Fabricated by a Microwave-Assisted Solvothermal Process", ACS Appl. Mater. Interfaces 2013, 5, 2004-2012.
Choi, H. K., et al., "Thin Film Knitting Pattern Morphology from a Miktoarm Star Terpolymer", Adv. Mater. 2014, 26, 2474-2479.
Chremos, A., et al, "Morphologies of Bottle-Brush Block Copolymers", ACS Macro Lett. 2014, 3, pp. 1096-1100.
Cushen, J. D., et al., "Oligosaccharide/Silicon-Containing Block Copolymers with 5 nm Features for Lithographic Applications", ACS Nano 2012, 6, 3424-3433.
Cushen, J. D., et al., "Thin Film Self-Assembly of Poly(trimethylsilylstyrene-b-D, L-lactide) with Sub-10 nm Domains", Macromolecules 2012, 45, 8722-8728.
Dong, J. et al., "Local delivery of slow-releasing temozolomide microspheres inhibits intracranial xenograft glioma growth", J. Cancer Res Clin Oncol (2012) 138: pp. 2079-2084.

(Continued)

*Primary Examiner* — Irina S Zemel
*Assistant Examiner* — Jeffrey S Lenihan
(74) *Attorney, Agent, or Firm* — Cantor Colburn LLP (57) ABSTRACT

A method of forming a microphase separated block copolymer includes exposing a block copolymer to acid vapor under conditions effective to provide the microphase separated block copolymer. The block copolymer includes a first hydrophobic block and a second hydrophobic block that is acid-sensitive. The microphase separated block copolymer includes the first hydrophobic block and a hydrophilic block derived from the second hydrophobic block. Exposing the block copolymer to the acid vapor is conducted in the solid state.

17 Claims, 5 Drawing Sheets

(56) References Cited

OTHER PUBLICATIONS

Durand, W. J., et al., Design of High-$\chi$ Block Copolymers for Lithography, J. Polym. Sci., Part A: Polym. Chem. 2015, 53, 344-352.
Fang, C. et al., Temozolomide Nanoparticles for Targeted Glioblastoma Therapy:, ACS Appl. Mater. Intefaces, 2015, 7; pp. 6674-6682.
Gai, Y., et al., "Polystyrene-block-poly(ethylene oxide) Bottlebrush Block Copolymer Morphology Transitions: Influence of Side Chain Length and Volume Fraction", Macromolecules 2017, 50, 1503-1511.
Georgopanos, P., et al.,"Synthesis, Molecular Characterization and Self-Assembly of (PS-b-PDMS)n Type Linear (n=1, 2) and Star (n=3, 4) Block Copolymers", Polym. Chem. 2017, 8, 843-850.
Hashimoto, T., et al., "Order-Disorder Transition of Starblock Copolymers", J. Chem. Phys. 1988, 89, 2463-2472.
Hawker et al., "Block Copolymer Lithography: Merging "Bottom-Up" with "Top-Down" Processes", MRS Bulletin, vol. 30, 2005, pp. 952-966.
Hirai, T. et al., "One-Step Direct-Patterning Template Utilizing Self-Assembly of Poss-Containing Block Copolymers", Adv. Mater. 2009, 21, 4334-4338.
Hirai, T., et al., "Hierarchical Nanostructures of Organosilicate Nanosheets within Self-Organized Block Copolymer Films", Macromolecules 2008, 41, 4558-4560.
Hong, S. W., et al., "On the Self-Assembly of Brush Block Copolymers in Thin Films", ACS Nano 2013, 7, 9684-9692.
Ijichi, Y., et al., "Order-Disorder Transition of Star-Block Copolymers. 2. Effect of Arm Number", Macromolecules 1989, 22, 2817-2824.
Isono, T., et al.,"Sub-10 nm Nano-Organization in AB2- and AB3-type Miktoarm Star Copolymers Consisting of Maltoheptaose and Polycaprolactone", Macromolecules 2013, 46, 1461-1469.
Jeong, G. et al.,"Realizing 5.4 nm Full Pitch Lamellar Microdomains by a Solid-State Transformation", Macromolecules, 2017 DOI 10.1021/acs.macromol.7b01443; 7 pages.
Jeong, S.-J. et al., "Directed Self-Assembly of Block Copolymers for Next Generation Nanolithography", Mater. Today 2013, 16, 468-476.
Jung, Y. S., et al., "Nanowire Conductive Polymer Gas Sensor Patterned Using Self-Assembled Block Copolymer Lithography", Nano Lett. 2008, 8, 3776-3780.
Jung, Y. S.; Ross, C. A. Orientation-Controlled Self-Assembled Nanolithography Using a Polystyrene-polydimethylsiloxane Block Copolymer. Nano Lett. 2007, 7, 2046-2050.
Kawamoto, K. et al., "Graft-through Synthesis and Assembly of Janus Bottlebrush Polymers from A-Branch-B Diblock Macromonomers", J. Am. Chem. Soc. 2016, 138, pp. 11501-11504.
Kennemur, J. G., et al., "Sub-5 nm Domains in Ordered Poly(cyclohexylethylene)-block-poly(methyl methacrylate) Block Polymers for Lithography", Macromolecules 2014, 47, 1411-1418.
Kim, E. et all, "A Top Coat with Solvent Annealing Enables Perpendicular Orientation of Sub-10 nm Microdomains in Si-Containing Block Copolymer Thin Films", Adv. Funct. Mater. 2014, 24, 6981-6988.
Kim, H.-C., et al., "Block Copolymer Based Nanostructures: Materials, Processes, and Applications to Electronics", Chem. Rev. 2009, 110, 146-177.
Liu, F., et al., "Dynamics of Phase Separation in Block Copolymer Melts", Phys. Rev. A 1989, 39, 4805.
Nose, T., "Coexistence Curves of Polystyrene/Poly(dimethylsiloxane) Blends", Polymer 1995, 36, 2243-2248.
Otsuka, I., et al., "Control of 10 nm Scale Cylinder Orientation in Self-Organized Sugar-Based Block Copolymer Thin Films Nanoscale", 2013, 5, 2637-2641.
Otsuka, I., et al., "Sub-10 nm Scale Nanostructures in Self-Organized Linear Di-and Triblock Copolymers and Miktoarm Star Copolymers Consisting of Maltoheptaose and Polystyrene", Macromolecules 2015, 48, 1509-1517.
Park et al, "Block Copolymer Lithography: Periodic Arrays of ~ 10 Holes in 1 Square Centimeter", Science, vol. 276, 1997, p. 1401-1404.
Park, S., et al., "Macroscopic 10-Terabit-per-Square-Inch Arrays from Block Copolymers with Lateral Order", Science 2009, 323, 1030-1033.
Pitet, L. M., et al., "Probing the Effect of Molecular Nonuniformity in Directed Self-Assembly of Diblock Copolymers in Nanoconfined Space", ACS Nano 2015, 9, 9594-9602.
Sakai-Otsuka, Y., et al., "Self-Assembly of Carbohydrate-block-poly(3-hexylthiophene) Diblock Copolymers into Sub-10 nm Scale Lamellar Structures", Macromolecules 2017, 50, 3365-3376.
Shi, W., et al., "Producing Small Domain Features Using Miktoarm Block Copolymers with Large Interaction Parameters", ACS Macro Lett. 2015, 4, 1287-1292.
Sinturel, C.,et al.,"High $\chi$-Low N Block Polymers: How Far Can We Go?", ACS Macro Lett. 2015, 4, 1044-1050.
Sun, Z., et al. "Directed Self-Assembly of Poly(2-vinylpyridine)-b-polystyrene-b-poly(2-vinylpyridine) Triblock Copolymer with Sub-15 nm Spacing Line Patterns Using a Nanoimprinted Photoresist Template", Adv. Mater. 2015, 27, 4364-4370.
Sun, Z., et al., "Using Block Copolymer Architecture to Achieve Sub-10 nm Periods", Polymer 2017, 121, 297-303.
Sweat, D. P., et al., "Rational Design of a Block Copolymer with a High Interaction Parameter", Macromolecules 2014, 47, 6687-6696.
Tang, C., et al., "Evolution of Block Copolymer Lithography to Highly Ordered Square Arrays", Science 2008, 322, 429-432.
Xia, Y., et al., "Efficient Synthesis of Narrowly Dispersed Brush Copolymers and Study of Their Assemblies: The Importance of Side Chain Arrangement", J. Am. Chem. Soc. 2009, 131, 18525-18532.
Young, W.-S, et al., "Salt Doping in PEO-Containing Block Copolymers: Counterion and Concentration Effects", Macromolecules 2009, 42, 2672-2678.

* cited by examiner

METHOD OF FORMING A MICROPHASE SEPARATED BLOCK COPOLYMER AND MICROPHASE SEPARATED BLOCK COPOLYMER

STATEMENT REGARDING FEDERALLY SPONSORED RESEARCH & DEVELOPMENT

This invention was made with government support under contract number 16RT1602 awarded by the Air Force Office of Scientific Research. The government has certain rights in the invention.

BACKGROUND

The self-assembly of block copolymers (BCPs) represents one route by which the size scale of features in microelectronic or storage devices can be extended into the single nanometer range, well beyond that attainable by current photolithographic processes. See, e.g., Bang, J.; Jeong, U.; Ryu, D. Y.; Russell, T. P.; Hawker, C. J. Block Copolymer Nanolithography: Translation of Molecular Level Control to Nanoscale Patterns. *Adv. Mater.* 2009, 21, 4769-4792; Kim, H.-C.; Park, S.-M.; Hinsberg, W. D. Block Copolymer Based Nanostructures: Materials, Processes, and Applications to Electronics. *Chem. Rev.* 2009, 110, 146-177; Tang, C.; Lennon, E. M.; Fredrickson, G. H.; Kramer, E. J.; Hawker, C. J. Evolution of Block Copolymer Lithography to Highly Ordered Square Arrays. *Science* 2008, 322, 429-432; Jeong, S.-J.; Kim, J. Y.; Kim, B. H.; Moon, H.-S.; Kim, S. O. Directed Self-Assembly of Block Copolymers for Next Generation Nanolithography. *Mater. Today* 2013, 16, 468-476; Hawker, C. J.; Russell, T. P. Block Copolymer Lithography: Merging "Bottom-up" with "Top-Down" Processes. *MRS Bull.* 2005, 30, 952-966. To achieve these small-scale features requires the manipulation of the chain architecture, for example using star-block (see, e.g., Hashimoto, T.; Ijichi, Y.; Fetters, L. J. Order-Disorder Transition of Starblock Copolymers. *J. Chem. Phys.* 1988, 89, 2463-2472; Ijichi, Y.; Hashimoto, T.; Fetters, L. J. Order-Disorder Transition of Star-Block Copolymers. 2. Effect of Arm Number. *Macromolecules* 1989, 22, 2817-2824; Georgopanos, P.; Lo, T.-Y.; Ho, R.-M.; Avgeropoulos, A. Synthesis, Molecular Characterization and Self-Assembly of (PS-b-PDMS)$_n$ Type Linear (n=1, 2) and Star (n=3, 4) Block Copolymers. *Polym. Chem.* 2017, 8, 843-850; Sun, Z.; Zhang, W.; Hong, S.; Chen, Z.; Liu, X.; Xiao, S.; Coughlin, E. B.; Russell, T. P. Using Block Copolymer Architecture to Achieve Sub-10 nm Periods. *Polymer* 2017, 121, 297-303), mikto-arm (see, e.g., Otsuka, I.; Zhang, Y.; Isono, T.; Rochas, C.; Kakuchi, T.; Satoh, T.; Borsali, R. Sub-10 nm Scale Nanostructures in Self-Organized Linear Di- and Triblock Copolymers and Miktoarm Star Copolymers Consisting of Maltoheptaose and Polystyrene. *Macromolecules* 2015, 48, 1509-1517; Choi, H. K.; Nunns, A.; Sun, X. Y.; Manners, I.; Ross, C. A. Thin Film Knitting Pattern Morphology from a Miktoarm Star Terpolymer. *Adv. Mater.* 2014, 26, 2474-2479; Shi, W.; Tateishi, Y.; Li, W.; Hawker, C. J.; Fredrickson, G. H.; Kramer, E. J. Producing Small Domain Features Using Miktoarm Block Copolymers with Large Interaction Parameters. *ACS Macro Lett.* 2015, 4, 1287-1292; Isono, T.; Otsuka, I.; Kondo, Y.; Halila, S.; Fort, S.; Rochas, C.; Satoh, T.; Borsali, R.; Kakuchi, T. Sub-10 nm Nano-Organization in AB$_2$- and AB$_3$-type Miktoarm Star Copolymers Consisting of Maltoheptaose and Polycaprolactone. *Macromolecules* 2013, 46, 1461-1469) or brush BCPs (see, e.g., Hong, S. W.; Gu, W.; Huh, J.; Sveinbjornsson, B. R.; Jeong, G.; Grubbs, R. H.; Russell, T. P. On the Self-Assembly of Brush Block Copolymers in Thin Films. *ACS Nano* 2013, 7, 9684-9692; Chremos, A.; Theodorakis, P. E. Morphologies of Bottle-Brush Block Copolymers. *ACS Macro Lett.* 2014, 3, 1096-1100; Gai, Y.; Song, D.-P.; Yavitt, B. M.; Watkins, J. J. Polystyrene-block-poly(ethylene oxide) Bottlebrush Block Copolymer Morphology Transitions: Influence of Side Chain Length and Volume Fraction. *Macromolecules* 2017, 50, 1503-1511; Xia, Y.; Olsen, B. D.; Kornfield, J. A.; Grubbs, R. H. Efficient Synthesis of Narrowly Dispersed Brush Copolymers and Study of Their Assemblies: The Importance of Side Chain Arrangement. *J. Am. Chem. Soc.* 2009, 131, 18525-18532; Kawamoto, K.; Zhong, M.; Gadelrab, K. R.; Cheng, L.-C.; Ross, C. A.; Alexander-Katz, A.; Johnson, J. A. Graft-through Synthesis and Assembly of Janus Bottlebrush Polymers from A-Branch-B Diblock Macromonomers. *J. Am. Chem. Soc.* 2016, 138, 11501-11504), or significantly increasing the segmental interaction parameter ($\chi$) between the blocks (see, e.g., Sweat, D. P.; Kim, M.; Larson, S. R.; Choi, J. W.; Choo, Y.; Osuji, C. O.; Gopalan, P. Rational Design of a Block Copolymer with a High Interaction Parameter. *Macromolecules* 2014, 47, 6687-6696; Durand, W. J.; Blachut, G.; Maher, M. J.; Sirard, S.; Tein, S.; Carlson, M. C.; Asano, Y.; Zhou, S. X.; Lane, A. P.; Bates, C. M. Design of High-$\chi$ Block Copolymers for Lithography. *J. Polym. Sci., Part A: Polym. Chem.* 2015, 53, 344-352; Kim, E.; Kim, W.; Lee, K. H.; Ross, C. A.; Son, J. G. A Top Coat with Solvent Annealing Enables Perpendicular Orientation of Sub-10 nm Microdomains in Si-Containing Block Copolymer Thin Films. *Adv. Funct. Mater.* 2014, 24, 6981-6988). The promise of this bottom-up, self-assembly approach with BCPs has attracted a significant amount of attention from laboratories world-wide to push feature sizes into the sub-10 nm range. Aside from controlling the feature size, other challenges associated with the self-assembly of BCPs involve regulating the orientation of lamella or cylindrical microdomains, casting uniform ultrathin films, and production of nanostructures with good lateral ordering. Much progress has been made since the initial work of Register and coworkers (see, e.g., Park, M.; Harrison, C.; Chaikin, P. M.; Register, R. A.; Adamson, D. H. Block Copolymer Lithography: Periodic Arrays of ~1011 Holes in 1 Square Centimeter. *Science* 1997, 276, 1401-1404) on poly(styrene-b-butadiene) (PS-b-PB) and poly(styrene-b-isoprene) (PS-b-PI) but only now are we venturing into the sub-10 nm range.

To decrease the period or pitch ($L_0$) of the microphase separated morphology, the total number of segments of the copolymer (N) must be decreased. See, e.g., Sinturel, C.; Bates, F. S.; Hillmyer, M. A., High $\chi$-Low N Block Polymers: How Far Can We Go? *ACS Macro Lett.* 2015, 4, 1044-1050. Yet, as Nis decreased, a symmetric diblock copolymer is in a phase-mixed state when $\chi$N<10.5. See, e.g., Bang, J.; Jeong, U.; Ryu, D. Y.; Russell, T. P.; Hawker, C. J. Block Copolymer Nanolithography: Translation of Molecular Level Control to Nanoscale Patterns. *Adv. Mater.* 2009, 21, 4769-4792; Bates, F. S.; Fredrickson, G. H. Block Copolymer Thermodynamics: Theory and Experiment. *Annu. Rev. Phys. Chem.* 1990, 41, 525-557; Bates, F. S.; Fredrickson, G. H. Block Copolymers—Designer Soft Materials. *Phys. Today* 1999, 52, 32-38. If the BCP is microphase separated, the domain spacing is determined as $L_0 \sim \chi^{1/6} N^{2/3}$ in the strong segregation regime where the microdomain interfacial width is narrow. See, e.g., Liu, F.; Goldenfeld, N. Dynamics of Phase Separation in Block Copolymer Melts. *Phys. Rev. A* 1989, 39, 4805; Cushen, J. D.; Bates, C. M.; Rausch, E. L.; Dean, L. M.; Zhou, S. X.;

Willson, C. G.; Ellison, C. J. Thin Film Self-Assembly of Poly(trimethylsilylstyrene-b-D, L-lactide) with Sub-10 nm Domains. *Macromolecules* 2012, 45, 8722-8728. Independent of the chain architecture, to decrease $L_0$ and maintain a microphase separated morphology, N must be decreased, and $\chi$ must be increased. However, $\chi$ for PS and PI (~0.086 at 25° C.) is too small to achieve microdomain sizes less than 10 nm. To increase $\chi$, other methods have been explored, such as salt (Li, Cu) doping of poly(ethylene oxide) (PEO) domains of poly(styrene-b-ethylene oxide) (PS-b-PEO) (see, e.g., Young, W.-S.; Epps III, T. H. Salt Doping in PEO-Containing Block Copolymers: Counterion and Concentration Effects. *Macromolecules* 2009, 42, 2672-2678) or poly(2-vinylpyridine) (P2VP) domains of poly (styrene-b-(2-vinylpyridine)) (PS-b-P2VP) (see, e.g., Sun, Z.; Chen, Z.; Zhang, W.; Choi, J.; Huang, C.; Jeong, G.; Coughlin, E. B.; Hsu, Y.; Yang, X.; Lee, K. Y. Directed Self-Assembly of Poly(2-vinylpyridine)-b-polystyrene-b-poly(2-vinylpyridine) Triblock Copolymer with Sub-15 nm Spacing Line Patterns Using a Nanoimprinted Photoresist Template. *Adv. Mater.* 2015, 27, 4364-4370). For example, Russell and coworkers achieved an $L_0$ of 7 nm of cylindrical microdomains using gold salt that selectively complexed the PEO block of PS-b-PEO. See, e.g., Park, S.; Lee, D. H.; Xu, J.; Kim, B.; Hong, S. W.; Jeong, U.; Xu, T.; Russell, T. P. Macroscopic 10-Terabit-per-Square-Inch Arrays from Block Copolymers with Lateral Order. *Science* 2009, 323, 1030-1033. Alternatively, inorganic-containing hybrid BCPs have been investigated to increase $\chi$ by incorporating silicon or metal into one block of the BCP. See, e.g., Cushen, J. D.; Bates, C. M.; Rausch, E. L.; Dean, L. M.; Zhou, S. X.; Willson, C. G.; Ellison, C. J. Thin Film Self-Assembly of Poly(trimethylsilylstyrene-b-D, L-lactide) with Sub-10 nm Domains. *Macromolecules* 2012, 45, 8722-8728; Cushen, J. D.; Otsuka, I.; Bates, C. M.; Halila, S.; Fort, S.; Rochas, C.; Easley, J. A.; Rausch, E. L.; Thio, A.; Borsali, R. Oligosaccharide/Silicon-Containing Block Copolymers with 5 nm Features for Lithographic Applications. *ACS Nano* 2012, 6, 3424-3433. An additional advantage of these BCPs is the increase in the etch-contrast between the two blocks, making it easier to transfer the pattern to the underlying substrate. Ross and coworkers used optimized solvent vapor annealing conditions to achieve highly ordered line patterns with poly(styrene-b-dimethylsiloxane) (PS-b-PDMS). See, e.g., Jung, Y. S.; Ross, C. A. Orientation-Controlled Self-Assembled Nanolithography Using a Polystyrene-polydimethylsiloxane Block Copolymer. *Nano Lett.* 2007, 7, 2046-2050; Jung, Y. S.; Jung, W.; Tuller, H. L.; Ross, C. Nanowire Conductive Polymer Gas Sensor Patterned Using Self-Assembled Block Copolymer Lithography. *Nano Lett.* 2008, 8, 3776-3780. A highly aligned cylindrical microdomain morphology oriented perpendicular to the substrate was successfully achieved with an $L_0$ of 17 nm, since PS-b-PDMS has a relatively high $\chi$ value (~0.27 at 25° C.). See, e.g., Nose, T. Coexistence Curves of Polystyrene/Poly(dimethylsiloxane) Blends. *Polymer* 1995, 36, 2243-2248; Borah, D.; Shaw, M. T.; Holmes, J. D.; Morris, M. A. Sub-10 nm Feature Size PS-b-PDMS Block Copolymer Structures Fabricated by a Microwave-Assisted Solvothermal Process. *ACS Appl. Mater. Interfaces* 2013, 5, 2004-2012. In addition, Gopalan and coworkers synthesized polyhedral oligomeric silsesquioxane (POSS)-containing BCPs, poly(styrene-b-POSS methacrylate) (PS-b-PMAPOSS) and poly (methyl methacrylate-b-POSS methacrylate) (PMMA-b-PMAPOSS). See, e.g., Hirai, T.; Leolukman, M.; Hayakawa, T.; Kakimoto, M.-a.; Gopalan, P. Hierarchical Nanostructures of Organosilicate Nanosheets within Self-Organized Block Copolymer Films. *Macromolecules* 2008, 41, 4558-4560; Hirai, T.; Leolukman, M.; Liu, C. C.; Han, E.; Kim, Y. J.; Ishida, Y.; Hayakawa, T.; Kakimoto, M. a.; Nealey, P. F.; Gopalan, P. One-Step Direct-Patterning Template Utilizing Self-Assembly of Poss-Containing Block Copolymers. *Adv. Mater.* 2009, 21, 4334-4338. They reported about 10 nm cylindrical microdomains and successfully transferred the pattern with high etch-contrast by solvent annealing of BCPs.

Non-silicon containing BCPs have also been investigated. See, e.g., Sakai-Otsuka, Y.; Zaioncz, S.; Otsuka, I.; Halila, S.; Rannou, P.; Borsali, R. Self-Assembly of Carbohydrate-block-poly(3-hexylthiophene) Diblock Copolymers into Sub-10 nm Scale Lamellar Structures. *Macromolecules* 2017, 50, 3365-3376; Otsuka, I.; Tallegas, S.; Sakai, Y.; Rochas, C.; Halila, S.; Fort, S.; Bsiesy, A.; Baron, T.; Borsali, R. Control of 10 nm Scale Cylinder Orientation in Self-Organized Sugar-Based Block Copolymer Thin Films. *Nanoscale* 2013, 5, 2637-2641. Sequential living anionic polymerization has been used to synthesize a series of poly(4-tert-butylstyrene-b-2-vinylpyridine) (P(tBuSt)-b-P2VP) materials and reported a 9.6 nm pitch. See, e.g., Sweat, D. P.; Kim, M.; Larson, S. R.; Choi, J. W.; Choo, Y.; Osuji, C. O.; Gopalan, P. Rational Design of a Block Copolymer with a High Interaction Parameter. *Macromolecules* 2014, 47, 6687-6696. Hillmyer and coworkers achieved a 9 nm pitch for poly(cyclohexylethylene-b-methyl methacrylate) (PCHE-b-PMMA) having a lamellar morphology. See, e.g., Kennemur, J. G.; Yao, L.; Bates, F. S.; Hillmyer, M. A. Sub-5 nm Domains in Ordered Poly(cyclohexylethylene)-block-poly(methyl methacrylate) Block Polymers for Lithography. *Macromolecules* 2014, 47, 1411-1418. The requirement that copolymer blocks should be highly immiscible and chemically different from each other to obtain small $L_0$ does not only make it difficult to balance the interactions at the substrate and air interfaces, but also restricts the types of BCPs that can be used towards this goal. A viewpoint article by Sinturel and coworkers summarizes some of the BCPs that have been observed to self-assemble into sub-20 nm domain sizes, and also highlights the limited number of copolymers that form single nanometer full pitch dimensions, due to the intrinsically large interaction parameters required for the self-assembly of low molecular weight BCPs. See, e.g., Sinturel, C.; Bates, F. S.; Hillmyer, M. A., High $\chi$-Low N Block Polymers: How Far Can We Go? *ACS Macro Lett.* 2015, 4, 1044-1050. Furthermore, the molecular weight distribution of the BCPs also becomes increasingly important as the size scale of the feature (and the number of chains incorporated into each microdomain) gets smaller. See, e.g., Pitet, L. M.; Alexander-Moonen, E.; Peeters, E.; Druzhinina, T. S.; Wuister, S. F.; Lynd, N. A.; Meijer, E. Probing the Effect of Molecular Nonuniformity in Directed Self-Assembly of Diblock Copolymers in Nanoconfined Space. *ACS Nano* 2015, 9, 9594-9602. Successful pattern transfer of the small microdomains does not only rely on the proper orientation of the microdomains, but also on the high etch-contrast between the copolymer components, since the film thickness is reduced.

Therefore, there remains a continuing need in the art for developing new BCP materials to achieve high $\chi$ (e.g., a $\chi$ value of at least 0.1) to overcome the above-described technical limitations.

BRIEF SUMMARY

One embodiment is a method of forming a microphase separated block copolymer, the method comprising: exposing a block copolymer comprising a first hydrophobic block; and a second hydrophobic block, wherein the second hydrophobic block is acid-sensitive; to acid vapor under conditions effective to provide the microphase separated block copolymer comprising domains comprising the first hydrophobic block and domains comprising a hydrophilic block derived from the second hydrophobic block; and thermally annealing the microphase separated block copolymer at a temperature of 100 to 200° C. for a time of 1 to 24 hours; wherein the exposing is conducted in the solid state.

Another embodiment is a microphase separated block copolymer, wherein the microphase separated block copolymer comprises a first hydrophobic block and a hydrophilic block having a $\chi N$ value between the hydrophobic and hydrophilic blocks of greater than 10.5; and wherein the microphase separated block copolymer comprises lamellar or cylindrical microdomains having a pitch of less than or equal to 6 nanometers.

These and other embodiments are described in detail below.

BRIEF DESCRIPTION OF THE DRAWINGS

The following Figures represent exemplary embodiments.

DETAILED DESCRIPTION

The present inventors have determined a method for the preparation of self-assembled microphase separated block copolymers (BCPs) through an acid hydrolysis transformation advantageously carried out in the solid state. It has been observed that using the method disclosed herein, microphase separated block copolymers can exhibit a full pitch of less than 6 nanometers with individual domain sizes of less than 3 nanometers. In an embodiment, the use of poly(solketal methacrylate-b-styrene) (PSM-b-PS) is discussed. PSM-b-PS is a diblock copolymer with two hydrophobic blocks, and $\chi$ between PSM and PS is approximately 0.035 at 25° C., as determined from analysis of the correlation hole scattering of the copolymer in the disordered state. The PSM block can then be hydrolyzed to a hydrophilic poly(glycerol monomethacrylate) (PGM) block, which massively increases the x value and allows the copolymer to microphase separate even with a relatively low total molecular weight. Thus, the present inventors have discovered a method incorporating a solid state chemical transformation that allows for a phase-mixed BCP system to be transformed in the solid state into a microphase separated BCP without the use of any additives.

Accordingly, one aspect of the present disclosure is a method of forming a microphase separated block copolymer. The method comprises exposing a block copolymer in the solid state to acid vapor under conditions effective to provide the microphase separated block copolymer. The block copolymer comprises a first hydrophobic block and a second hydrophobic block that is acid-sensitive. As used herein, the term "acid-sensitive" is used to describe a hydrophobic block comprising repeating units including an acid-degradable group which, upon exposure to acid, undergoes a chemical transformation to reveal a corresponding hydrophilic block. The acid-degradable group is not particularly limited and can be, for example, an acetal group, a ketal group, a tert-butyl group, a tert-butyloxycarbonyl group, and the like. Preferably, the acid-degradable group is one which produces only reaction byproducts that are easily removed, for example under reduced pressure, by heating, or both. The microphase separated block copolymer comprises domains comprising the first hydrophobic block and domains comprising a hydrophilic block derived from the second hydrophobic block. The block copolymer can be a bulk sample or can be in the form of a film.

The first hydrophobic block of the block copolymer comprises repeating units derived from a $C_{1-12}$ alkyl (meth)acrylate, a $C_{1-12}$ aryl (meth)acrylate, styrenic monomers, fluorinated monomers, diene monomers (e.g., isoprene, butadiene, and the like) and combinations thereof. In some embodiments, the first hydrophobic block preferably comprises repeating units derived from a $C_{1-12}$ alkyl (meth)acrylate (e.g., polymethyl methacrylate), styrene, isoprene, butadiene, or a combination thereof. In a specific embodiment, the first hydrophobic block can comprise repeating units derived from styrene.

The second hydrophobic block comprises repeating units according to formula (I)

(I)

wherein $R^1$ is independently at each occurrence hydrogen or methyl, X is —O— or —NH—, and $L^1$ is independently at each occurrence a $C_{1-6}$ alkylene group. In some embodiments, $R^1$ is a hydrogen. In some embodiment, $R^1$ is a methyl group. In some embodiments, X is —O—. In some embodiments, $L^1$ is a $C_{1-3}$ alkylene group. In a specific embodiment, $L^1$ is a methylene group.

As described above, the second hydrophobic block is acid-sensitive, and can be transformed via contact with acid to reveal a corresponding hydrophilic block. In some embodiments, the hydrophilic block derived from the second hydrophobic block comprises repeating units according to formula (II), (III), or a combination there of (II)

(III)

wherein $R^1$ is independently at each occurrence hydrogen or methyl, X is —O— or —NH—, and $L^1$ is independently at each occurrence a $C_{1-6}$ alkylene group. In some embodiments, $R^1$ is a hydrogen. In some embodiment, $R^1$ is a methyl group. In some embodiments, X is —O—. In some embodiments, $L^1$ is a $C_{1-3}$ alkylene group. In a specific embodiment, $L^1$ is a methylene group. In some embodiments, the hydrophilic block comprises repeating units according to formula (II). In some embodiments, the hydrophilic block comprises repeating units according to formula (III). In some embodiments, the hydrophilic block comprises repeating units according to formula (II) and formula (III). Without wishing to be bound by theory, the relative amounts of repeating units according to formula (II) and formula (III) can be dictated by the length of time that the block copolymer is exposed to the acid vapor. In some embodiments, the molar ratio of repeating units of formula (II) to formula (III) can be 0.1:99.9 to 99.9 to 0.1, or 1:99 to 99:1, or 10:90 to 90:10, or 20:80 to 80:20, or 30:70 to 70:30 or 40:60 to 60:40, or 45:55 to 55:45.

The block copolymer (i.e., prior to exposure to acid vapor) can have a number average molecular weight of 1,000 to 200,000 grams per mole, or 2,000 to 200,000 grams per mole, or 2,000 to 175,000 grams per mole, or 2,000 to 170,000 grams per mole.

In some embodiments, the block copolymer can have a volume fraction of the second hydrophobic block copolymer of 0.25 to 0.75, or 0.3 to 0.7, or 0.3 to 0.6, or 0.35 to 0.55.

The acid used to generate the acid vapor can generally be any acid having a vapor pressure sufficient to provide the acid in the vapor form under the desired conditions, for example at 25° C. and 1 atmosphere. For example, the acid vapor can comprise trifluoroacetic acid vapor, hydrochloric acid vapor, trichloroacetic acid, dichloroacetic acid, hydrobromic acid, and the like, or combinations thereof. In an embodiment, the acid vapor comprises trifluoroacetic acid vapor.

The block copolymer is exposed to the acid vapor under conditions effective to provide the microphase separated block copolymer. For example, exposing the block copolymer to the acid vapor can be at a temperature of 20 to 30° C., preferably about 25° C., and at a pressure of about 1 atmosphere. Exposing the block copolymer to the acid vapor can be for a time of 1 to 30 minutes, or 1 to 25 minutes, or 1 to 20 minutes, or 5 to 15 minutes. In some embodiments, exposing the block copolymer to the acid vapor can be for a time of at least 10 minutes in order to obtain high conversion to the hydrophilic block, for example 10 to 30 minutes, or 10 to 25 minutes, or 10 to 20 minutes, or 10 to 15 minutes.

The method further comprises thermally annealing the microphase separated block copolymer, for example at a temperature of 100 to 200° C. for a time of 1 to 24 hours.

The microphase separated block copolymer provided by the method disclosed herein can comprise lamellar microdomains or cylindrical microdomains, and can have a pitch (also referred to as the periodicity of the repeating structural units in the block copolymer phase separation) of less than or equal to 6 nanometers, for example 1 to 6 nanometers. In some embodiments, the microphase separated block copolymer comprises lamellar microdomains having a pitch of less than or equal to 6 nanometers. In some embodiments, the microphase separated block copolymer comprises cylindrical microdomains having a pitch of less than or equal to 6 nanometers. In some embodiments, the microphase separated block copolymer comprises spherical microdomains having a pitch of less than or equal to 6 nanometers. The phase morphology of the microphase separated block copolymer can be dictated by the relative volume fractions of the first and second hydrophobic blocks.

Another aspect of the present disclosure is a method for providing a gradient microphase separated block copolymer film. The method comprises exposing the block copolymer film to the acid vapor under conditions effective to provide a gradient microphase separated block copolymer film, as described above. The gradient microphase separated block copolymer film comprises a first portion, a gradient portion, and optionally, a second portion. The first portion is adjacent to a first edge of the film, wherein the first portion is substantially microphase separated and comprises domains comprising the first hydrophobic block and domains comprising the hydrophilic block derived from the second hydrophobic block. The gradient portion extends across the film from the first portion to a second, opposite edge of the film or, when the second portion is present, to the second portion of the film (i.e., is positioned between the first portion and the second portion) and exhibits a microphase separation gradient, with increased phase-mixing towards the second edge. The second portion, when present, is adjacent to the second, opposite edge of the film, wherein the second portion is substantially phase-mixed and comprises the block copolymer comprising the first hydrophobic block and the second hydrophobic block. In some embodiments, the first portion of the microphase separated block copolymer film comprises lamellar microdomains or cylindrical microdomains, preferably having a pitch of less than or equal to 6 nanometers. The block copolymer film (prior to exposure to acid vapor) can have a thickness of 10 to 100 nanometers. In some embodiments, the microphase separated portions of the gradient microphase separated block copolymer film can have a thickness that is reduced by up to 20% relative to the thickness of the initial block copolymer film (i.e., prior to exposure to acid vapor).

In some embodiments related to the method for making the gradient film, the block copolymer film can be positioned relative to the acid vapor source such that the first edge of the film is a first distance from the acid vapor source, and the second edge is a second distance from the acid vapor source, wherein the first distance is less than the second distance. For example, in a specific embodiment, the block copolymer film can be positioned above the acid vapor source (i.e., suspended above the acid vapor source) in an open container, where the film is suspended by the second edge, and the first edge is closest to the acid vapor source. An exemplary system for achieving this aspect of the present disclosure is further described in the working examples below, and is depicted schematically in FIG. 8. Thus, the first edge of the film can be exposed to the acid vapor for a longer period of time relative to the second edge or a point on the film between the first and second edge. Thus the exposure time varies across the film, with the longest times at the first edge, and progressively shorter times across the film (i.e., across the gradient portion). When present, the second portion, which comprises phase-mixed block copolymer, has essentially not been exposed to the acid vapor.

In some embodiments, when the block copolymer is in the form of a film, the film can be disposed on a substrate.

Advantageously, no additives, etching processes, or substrate patterning are needed in order to achieve the microphase separation provided by the method of the present disclosure. For example, when the block copolymer is in the form of a film and is disposed on a substrate, it is not necessary for the substrate to be patterned (chemically or physically) in order to achieve the desired microphase separation.

Another aspect of the present disclosure is related to microphase separated block copolymers prepared by the method of the present disclosure, as well as microphase separated block copolymers having a particular phase morphology independent of their method of manufacture. Accordingly, a microphase separated block copolymer represents another aspect of the present disclosure. The microphase separated block copolymer comprises a first hydrophobic block and a hydrophilic block, which can be as described above. In some embodiments, the $\chi$ parameter between the first hydrophobic block and the hydrophilic block can be greater than 0.30 at 25° C., for example 0.40 to 0.50 at 25° C., or 0.42 to 0.46 at 25° C., or about 0.44 at 25° C. The $\chi$ parameter can be determined using a mean-field correlation-hole analysis of small angle X-ray scattering from the copolymer, as further described in the working examples below. The microphase separated block copolymer further comprises lamellar or cylindrical microdomains, which can have a pitch of less than or equal to 6 nanometers.

In some embodiments, the microphase separated block copolymer can have lamellar microdomains having a pitch of less than or equal to 6 nanometers. The microphase separated block copolymer can be a bulk sample or in the form of a thin film. In some embodiments, the microphase separated block copolymer can be a gradient microphase separated block copolymer film, as described above.

The methods and block copolymers of the present disclosure are further illustrated by the following non-limiting examples.

EXAMPLES

Uniform Microphase Separated Block Copolymers

Experimental details follow for the preparation of uniform microphase separated block copolymers.

Materials.

Solvents were purchased from commercial sources and used directly without purification unless noted otherwise. 2-cyano-2-propylbenzodithioate (Sigma-Aldrich Co.) was used directly without purification. Azo-bis(isobutyronitrile) (AIBN) was recrystallized from methanol and dried under vacuum before use. Toluene was stored over 4 Å molecular sieves. Styrene and solketal methacrylate monomers were passed through basic alumina column prior to polymerization to remove any inhibitors and adventitious peroxides. Trifluoroacetic acid (TFA) (Sigma-Aldrich Co.) was also used as received.

Synthesis of Solketal Methacrylate.

Under a nitrogen atmosphere, solketal (9.4 mL, 75.6 mmol), triethylamine (13.7 mL, 98.3 mmol) and dichloromethane (50 mL) were combined in a round bottom flask and stirred in an ice bath for 30 minutes. Methacryloyl chloride (7.4 mL, 75.8 mmol) was added dropwise to the cold solution. After 24 h, the white solid was filtered and the filtrate was washed in the following order: 1 M HCl, DI water, saturated NaHCO$_3$ solution, deionized (DI) water, then brine solution. The resulting organic liquid was passed through a basic alumina column then concentrated using a rotary evaporator. The crude product was distilled under reduced pressure with phenothiazine; solketal methacrylate was obtained as colorless oil, b.p. 52° C. (10 mTorr). Yield=7.72 g (51%). $^1$H-NMR (500 MHz, CDCl$_3$): δ 6.14 (m, H$_2$C=C, 1H), δ 5.66-5.52 (m, H$_2$C=C, 1H), δ 4.36 (m, —CH$_2$—CH, 1H), δ 4.21 (d, —CH$_2$—CH, 2H), δ 4.09 (dd, —C—O—CH$_2$, 1H), δ 3.79 (dd, —C—O—CH$_2$, 1H), δ 1.95 (s, H$_2$C=C—CH$_3$, 3H), δ 1.40 (d, —C(CH$_3$)$_3$, 6H).

Synthesis of PSM Homopolymer.

For 1,200 g/mol PSM, solketal methacrylate (1.88 mL, 9.65 mmol), 2-cyano-2-propylbenzodithioate (0.4276 g, 1.93 mmol), AIBN (15.6 mg, 0.095 mmol), and toluene (1.04 mL) were added to a reaction flask. The mixture was degassed by three cycles of freeze-pump-thaw, and placed in an oil bath at 65° C. After 90 minutes, the flask was cooled to room temperature, and the contents of the flask were diluted with dichloromethane. The polymer was subsequently precipitated in cold (−78° C.) petroleum ether (six times), and was dried overnight in vacuum at room temperature. PSM was isolated as a pink solid (yield=0.30 g). $^1$H-NMR was used to determine the polymer molecular weight by comparing the signal integral areas of the dithiobenzoate end group peak (protons ortho to the dithiocarbonyl group) at 7.86 ppm to that of the PSM peak at 4.3 ppm.

Synthesis of PSM-b-PS Diblock Copolymer.

Figure 1:
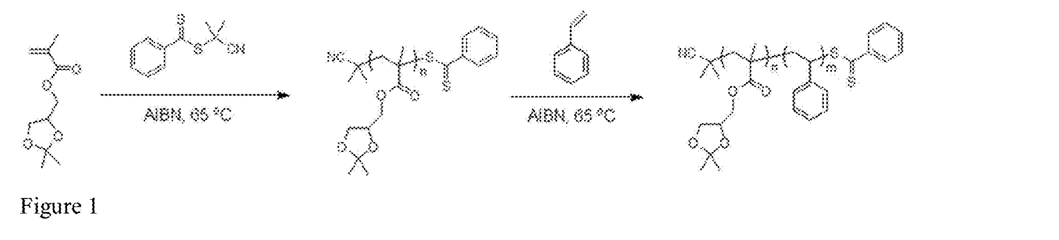
FIG. 1 is a chemical scheme showing the synthetic preparation of PSM-b-PS using reversible addition-fragmentation chain-transfer (RAFT) polymerization.

PSM-b-PS diblock copolymers with the volume fractions of PSM block ranging from 0.39 to 0.53 and the total molecular weights ranging from 2,200 g/mol (N=16) to 169,000 g/mol (N=1246) were prepared by a sequential reversible addition-fragmentation chain-transfer (RAFT) polymerization of PSM and PS as shown in FIG. 1. To prepare 2,200 g/mol BCP, PSM homopolymer (1,200 g/mol, 0.1029 g, 0.10 mmol) and AIBN (6.0 μmol from 0.1 M stock solution in styrene) were dissolved in styrene (0.44 mL, 3.83 mmol) in a reaction flask. The mixture was degassed by three cycles of freeze-pump-thaw, and placed in an oil bath at 65° C. After 9 h, the flask was cooled to room temperature, and the contents of the flask were diluted with dichloromethane. The polymer was subsequently precipitated in cold (−78° C.) pentane (three times), and was dried overnight in vacuum at room temperature. PSM-b-PS was isolated as a pink solid (yield=0.15 g). $^1$H-NMR was used to determine the polymer molecular weight by comparing the signal integral areas of dithiobenzoate end group peak (protons ortho to the dithiocarbonyl group) at 7.86 ppm to that of the aromatic PS peaks at 6.3-7.3 ppm. Table 1 provides information related to composition of all PSM-b-PS copolymers and their sample codes.

TABLE 1

| Sample Code | Total $M_n$ (g/mol) | $Đ_{PSM-PS}{}^a$ | PSM $M_n$ (g/mol) | $Đ_{PSM}{}^a$ | $N_{PSM}$ | PS $M_n$ (g/mol) | $N_{PS}$ | $f_{PSM}{}^d$ |
|---|---|---|---|---|---|---|---|---|
| P(SM82-S87) | 169,000 | 1.26 | 81,700$^b$ | 1.15 | 408 | 87,300 | 838 | 0.46 |
| P(SM46-S47) | 93,700 | 1.16 | 46,300$^b$ | 1.23 | 231 | 47,400 | 455 | 0.47 |
| P(SM27-S25) | 51,100 | 1.22 | 26,600$^b$ | 1.29 | 133 | 24,500 | 235 | 0.49 |
| P(SM13-S14) | 26,800 | 1.22 | 13,200$^b$ | 1.09 | 66 | 13,600 | 131 | 0.47 |
| P(SM7-S7.4) | 14,500 | 1.07 | 7,100$^b$ | 1.16 | 37 | 7,400 | 68 | 0.46 |
| P(SM4.6-S3.6) | 8,400 | 1.20 | 4,600$^b$ | 1.13 | 23 | 3,600 | 35 | 0.53 |
| P(SM1.2-S1.7) | 2,900 | 1.04 | 1,200$^c$ | 1.01 | 6 | 1,700 | 16 | 0.39 |
| P(SM1.2-S1) | 2,200 | 1.02 | 1,200$^c$ | 1.01 | 6 | 1,000 | 10 | 0.52 |

$^a$Dispersity (Đ) determined by SEC in THF using PS calibration;
$^b$Number average molecular weight (Mn) of PSM block determined by SEC with a light scattering detector (T = 30° C.; λ = 630 nm) using a refractive index increment (dn/dc) of 0.067 for PSM;
$^c$Calculated from $^1$H-NMR end group analysis.
$^d$Volume fraction of PSM.

Acid Hydrolysis of PSM-b-PS Copolymer.

Figure 2:
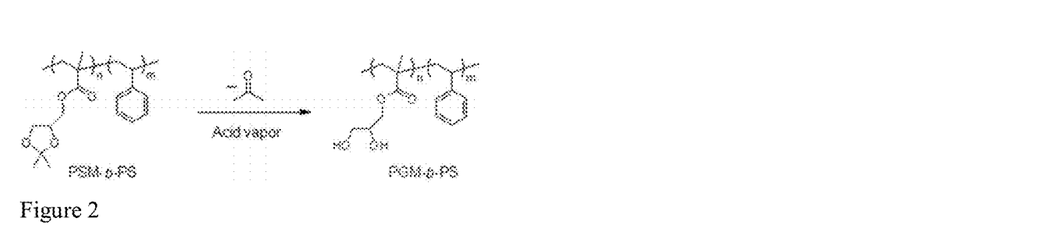
FIG. 2 is a chemical scheme showing the chemical transformation of PSM-b-PS to PGM-b-PS by acid hydrolysis reaction. During this reaction, acetone is generated as a by-product.

To transform PSM segments to PGM segments in solid state, TFA vapor was applied to PSM-b-PS copolymers, since TFA has a relatively high vapor pressure (97.5 mmHg at 20° C.) and low boiling point (72.4° C.) in comparison to other acids. A powder of PSM-b-PS was placed in a sealed glass jar with 200 μL of TFA for different periods of time, and then the residual TFA vapor and acetone, a by-product of the hydrolysis, in the sample was removed by purging with dry nitrogen gas for several minutes after removing it from the glass jar. Subsequently, the converted samples were placed in a vacuum oven at room temperature for 2 hours and thermally annealed at 150-170° C. for 12 h prior to small-angle X-ray scattering (SAXS) measurement. FIG. 2 describes the acid hydrolysis of PSM-b-PS copolymer.

Small-Angle X-Ray Scattering Analysis.

The morphologies of PSM-b-PS and PGM-b-PS samples in the bulk were investigated using SAXS analysis. A steel washer, 2 mm in thickness, was used to mold the sample powder, and then sealed on both sides using 0.03 mm thin Kapton films. To make thermally equilibrated morphologies, all samples were annealed at 150-170° C. for 12 h under vacuum. SAXS was performed using a Ganesha 300XL X-ray instrument with Cu Kα radiation (λ=0.1542 nm), where the size of incident beam was ~0.4 mm in diameter. A 2-dimensional detector recorded SAXS pattern over a scattering vector, $q=(4\pi/\lambda)\sin\theta$, range from 0.03 nm$^{-1}$ to 3.0 nm$^{-1}$, where λ is the X-ray wavelength and 2θ is the scattering angle. The sample to detector distance was calibrated using the primary diffraction peak of the silver behenate at q=1.076 nm$^{-1}$. Temperature-dependent SAXS studies used a heating stage (Linkam Scientific) with a temperature controller. The sample powder was compression molded into a small steel washer with a 0.5 mm thickness at 150° C. for 10 min to make a flat surface. The Kapton films were also placed on both sides of the sample for sealing. The heating controller increased temperature at constant rate 1.0° C./min from 120° C. to 260° C. under vacuum. The sample was allowed to thermally equilibrate for 10 min before acquiring SAXS data for 10 min at each temperature with 10° C. increase intervals. The absolute intensity was obtained by standardless calibration using a PIN diode and a Pilatus detector, which can measure the intensity of the direct beam and transmission of the sample and the scattering intensity, respectively. See, e.g., Ren, L.; Shah, P. N.; Faust, R. Morphology and Tensile Properties of Model Thermoplastic Polyurethanes with MDI/Butanediol Based Monodisperse Hard Segments. *J. Polym. Sci., Part B: Polym. Phys.* 2016, 54, 2485-2493.

Figure 3:
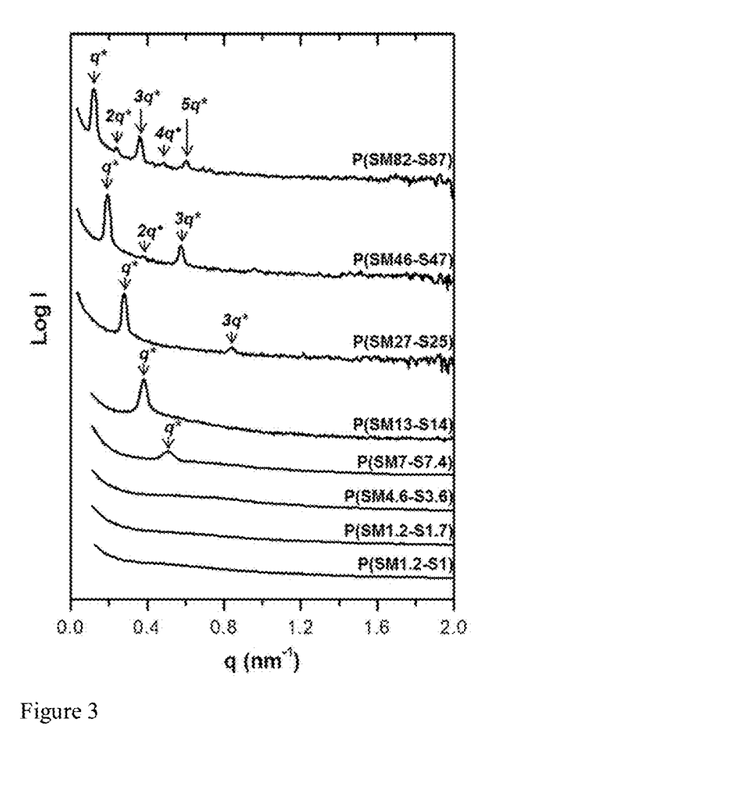
FIG. 3 shows small angle X-ray scattering (SAXS) average intensity profiles for PSM-b-PS copolymers depending on molecular weight after thermal annealing.

SAXS profiles for a series of PSM-b-PS copolymer, having the total molecular weights ranging from 2,200 g/mol (N=16) to 169,000 g/mol (N=1246), measured at room temperature after thermal annealing, are shown in FIG. 3. For the highest molecular weight copolymer, P(SM82-S87), a well-ordered lamellar microdomain morphology was observed, as evidenced by the position of higher order reflections, with a $L_0=2\pi/q^*$ of 53.4 nm (q*=0.118 nm$^{-1}$). With decreasing PSM-b-PS molecular weight, the number of scattering peaks decreased, as would be expected. For P(SM7-S7.4), the smallest ordered microphase separated structure was found to have an Lo of 12.0 nm (q*=0.523 nm$^{-1}$) from the weak primary reflection, indicating the microphase separation of the PSM-b-PS into sub-6 nm domains. The three lowest molecular weight copolymers showed a phase-mixed (or disordered) morphology.

Figure 4:
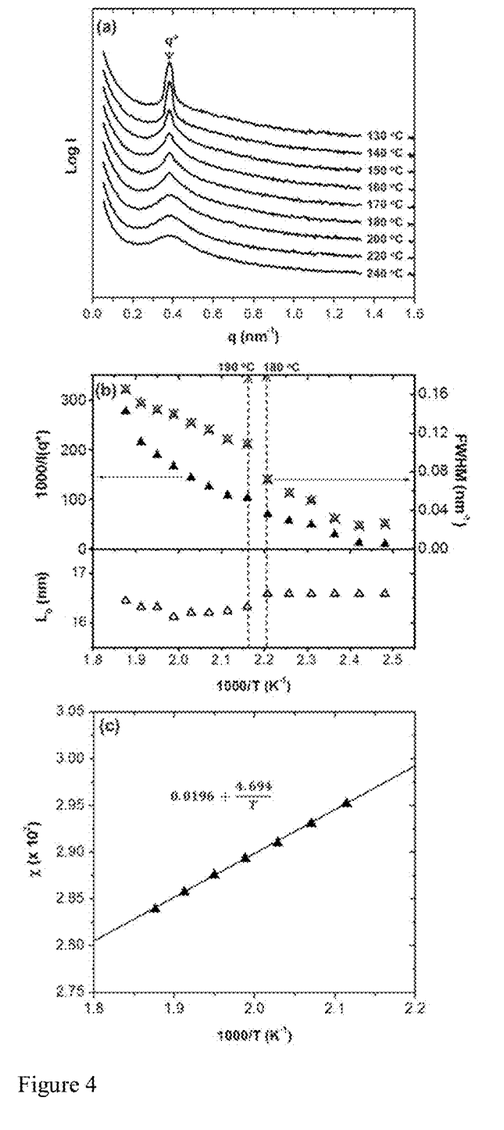
FIG. 4 shows (a) SAXS absolute intensity profiles for P(SM13-S14) with various temperatures at a heating rate of 1.0° C./min. The intensity profiles were shifted as a function of temperature in the range of 130° C. to 240° C. (b) The inverse of a maximum intensity ($1000/I(q^*)$), full-width at half-maximum (FWHM), and domain spacing ($L_0=2\pi/q^*$) calculated by SAXS profiles are marked at each temperature. (c) The interaction parameter ($\chi$) obtained from Leibler incompressible scattering function is plotted against the inverse of temperature. The $\chi$ is fitted to linear relation as $\chi=0.0196+4.694/T$.

The correlation hole scattering arising from the phase-mixed symmetric BCP-melts enable the determination of χ by the mean-field theory. See, e.g., Leibler, L. Theory of Microphase Separation in Block Copolymers. *Macromolecules* 1980, 13, 1602-1617; Zhao, Y.; Sivaniah, E.; Hashimoto, T. SAXS Analysis of the Order-Disorder Transition and the Interaction Parameter of Polystyrene-block-poly(methyl methacrylate). *Macromolecules* 2008, 41, 9948-9951; Russell, T. P.; Hjelm Jr, R. P.; Seeger, P. A. Temperature Dependence of the Interaction Parameter of Polystyrene and Poly(methyl methacrylate). *Macromolecules* 1990, 23, 890-893; Ahn, H.; Ryu, D. Y.; Kim, Y.;

Kwon, K. W.; Lee, J.; Cho, J. Phase Behavior of Polystyrene-b-poly(methyl methacrylate) Diblock Copolymer. *Macromolecules* 2009, 42, 7897-7902. In this analysis, an arbitrary reference volume, 118 Å$^3$, was used to normalize a volume-based degree of polymerization ($N_v$) because of the two different homopolymer densities between PSM and PS. The densities of PSM (1.148 g/cm$^3$) and PS (1.033 g/cm$^3$) were determined with a pycnometer. To calculate the $\chi$, the scattering function (S(q)) for an incompressible system, as described by Leibler was fit to the scattering intensity (I(q)), where I(q) is defined as I(q)=$k_n$×S(q), where $k_n$ indicates the contrast factor, and the S(q) is given by S(q)$^{-1}$=F(q)−2$\chi$, where F(q) is the interference function composed of the Debye scattering function for individual blocks defined in terms of the radius of gyration of a Gaussian chain ($R_g$) and q. Dividing I(q) by the maximum intensity at q*(I(q*)), the equation can obtained without the contrast factor as I(q)/I(q*)=(F(q*)−2$\chi$)/(F(q)−2$\chi$). From this equation, $\chi$ value is determined from a nonlinear regression analysis. The temperature dependence of $\chi$ is then given by $\chi$=α+β/T. FIG. 4a shows SAXS intensity profiles for P(SM13-S14) at various temperatures from 130° C. to 240° C. For P(SM13-S14), at lower temperature than ~180° C., an $L_0$ of 16.6 nm with the sharp primary peak at q*=0.379 nm$^{-1}$ was found. However, after heating to 200° C., the primary peak weakened and a diffuse scattering profile was observed, indicating the transition into the phase-mixed state. To quantify this order-disorder behavior, the reciprocal of the maximum intensity (1000/I(q*)), the full-width at half-maximum (FWHM), and the $L_0$ as function of the inverse of temperature (1/K) were determined from the SAXS profiles. FIG. 4b shows these characteristics of the scattering profiles from 130-260° C., in 10° C. increments. The order-disorder transition temperature ($T_{ODT}$) was observed between 180° C. and 190° C. through the sharp increase of 1000/I(q*) and the FWHM. When the temperature approaches the $T_{ODT}$, the $L_0$ of P(SM13-S14) decreased slightly and then fluctuated with increasing temperature. These variations of the scattering parameters above the ODT indicated that $\chi$ between the PSM and PS blocks of in the copolymer decreased. In FIG. 4c, the $\chi$ values of PSM-b-PS are plotted as a function of the inverse of temperature, and fitted to a linear equation as $\chi$=0.0196+4.694/T, calibrated to $N_v$=347 for P(SM13-S14). From the derived linear equation, the $\chi$ value between PSM and PS is approximately 0.035 at 25° C., which is larger than that of PS-b-PMMA (~0.031 at 25° C.). See, e.g., Widin, J. M.; Kim, M.; Schmitt, A. K.; Han, E.; Gopalan, P.; Mahanthappa, M. K. Bulk and Thin Film Morphological Behavior of Broad Dispersity Poly(styrene-b-methyl methacrylate) Diblock Copolymers. *Macromolecules* 2013, 46, 4472-4480. However, this is still lower than that for PS-b-PI and PS-b-P2VP (~0.128 at 25° C.) at a 118 Å$^3$ reference volume. See, e.g., Gu, X.; Gunkel, I.; Russell, T. P. Pattern Transfer Using Block Copolymers. *Philos. Trans. R. Soc. Lond. A* 2013, 371, 20120306; Dai, K. H.; Kramer, E. J. Determining the Temperature-Dependent Flory Interaction Parameter for Strongly Immiscible Polymers from Block Copolymer Segregation Measurements. *Polymer* 1994, 35, 157-161.

Figure 5:
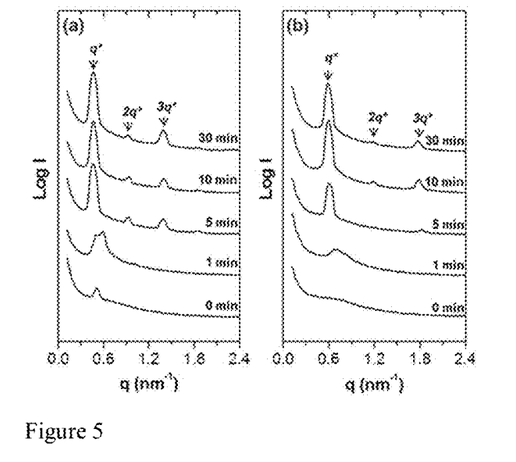
FIG. 5 shows SAXS profiles after exposure to TFA vapor with various time. The intensity profiles of (a) P(SM7-S7.4) and (b) P(SM4.6-S3.6) are plotted against scattering vector ranging from 0 min to 30 min. Both samples were thermally annealed at 150° C. for 12 h after exposure.

For the solid state transformation, a powder of PSM-b-PS was exposed to TFA vapor in a sealed jar for different periods of time. FIG. 5a shows the SAXS profiles for P(SM7-S7.4) after exposure to TFA vapor from 0 min to 30 min. The copolymer initially had a weak principal scattering peak; however, after 1 min of exposure to TFA vapor, a broad peak displaying two maxima was observed. One corresponding to the original P(SM7-S7.4), and the other arising from the copolymer after the PSM block was hydrolyzed into PGM. The appearance of the two structures suggests that the TFA has not fully penetrated into the material. After 5 min of exposure, a strong primary scattering peak at q*=0.448 nm$^{-1}$ was observed resulting to an increase in $L_0$ from 12.0 nm to 14.0 nm. Multiple higher order reflections (2q* and 3q*) were also detected, which suggests the formation of a strongly microphase separated system. Similarly, the evolution of lamella nanostructure from a disordered P(SM4.6-S3.6) after exposure to TFA vapor was also monitored by SAXS (FIG. 5b). After 1 min of exposure to TFA, a diffuse primary reflection was observed at q*=0.687 nm$^{-1}$ ($L_0$=9.1 nm). After 5 min of exposure, the peak shifted to lower q region (q*=0.581 nm$^{-1}$) with an $L_0$ of 10.8 nm together with the appearance of a weak higher order peak at 3q*. From these results, we were able to demonstrate that a disordered or weakly ordered morphology can be converted into a highly ordered microphase separated nanostructure through a solid state chemical transformation of PSM-b-PS to PGM-b-PS using TFA vapor. The hydrolysis reaction is complete within 10 min of exposure to TFA vapor in a closed system. Conversion of the hydrophobic PSM to the hydrophilic PGM markedly changes the segmental interaction between the blocks of the copolymer and results in the formation of ordered morphology even from low molecular weight copolymer.

Figure 6:
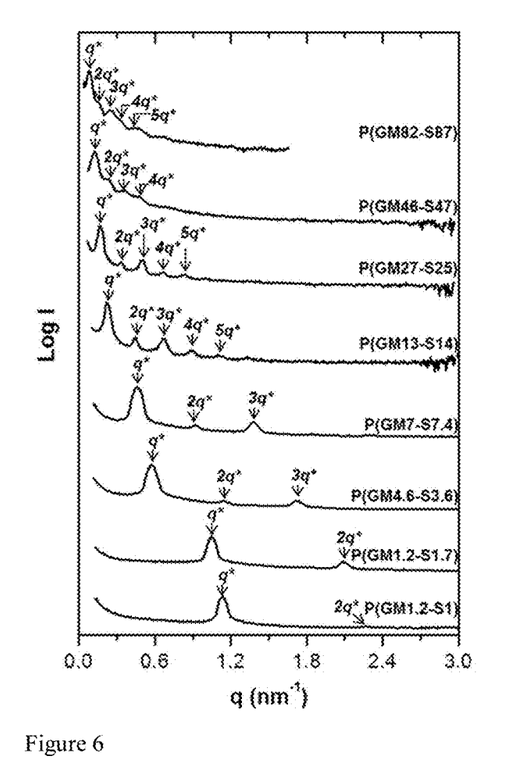
FIG. 6 SAXS average intensity profiles for PGM-b-PS copolymers depending on molecular weight after thermal annealing. PSM-b-PS copolymers were fully converted to PGM-b-PS by exposure to TFA vapor.

FIG. 6 shows the SAXS intensity profiles of a series of PGM-b-PS BCPs measured at room temperature after thermal annealing. All of the copolymers were fully converted by exposure to TFA vapor for at least 10 min. For P(GM82-S87), the largest increase of $L_0$ was observed from 53.4 nm to 81.7 nm due to the increased stretching of the copolymer chains at the interface due to the increase in $\chi$ (Table 2). Many higher order reflections are also seen for the PGM-b-PS series in comparison to the PSM-b-PS series as a result of the strong microphase separation. Furthermore, acetone, a byproduct of the hydrolysis reaction, plasticizes the copolymer and enables the persistence of the lamellar microdomain morphology due to the increase in mobility of the copolymer chains. Multiple higher order reflections were seen for P(GM1.2-S1) with an $L_0$ of 5.4 nm (q*=1.164 nm$^{-1}$), which is the smallest pitch obtained in this study, even though the total molecular weight is 2,200 g/mol. This arises from the massive increase in $\chi$ value between PGM and PS blocks, where preliminary studies indicate it to be at least 0.40-0.43 at $T_{ODT}$ based on the reference volume of 118 Å$^3$ and the ordering condition for a symmetric diblock copolymer ($\chi N_v$>10.5). Furthermore, a huge increase in the enthalpic contribution of $\chi$ value for PGM-b-PS in comparison to PSM-b-PS may allow this BCP to self-assemble into sub-3 nm full pitch. We are currently evaluating $\chi$ exactly and determining both the enthalpic and entropic contributions to $\chi$ for PGM-b-PS, and its dependence on the degree of chemical transformation of the PSM block and temperature.

TABLE 2

| Total N | PSM-b-PS $L_0$ (nm) | PGM-b-PS $L_0$ (nm) |
| --- | --- | --- |
| 1,246 | 53.4 | 81.7 |
| 686 | 32.7 | 50.2 |
| 368 | 22.7 | 37.0 |
| 197 | 16.6 | 26.3 |
| 105 | 12.0 | 14.0 |
| 58 | Disorder | 10.8 |

TABLE 2-continued

| Total N | PSM-b-PS L₀ (nm) | PGM-b-PS L₀ (nm) |
| --- | --- | --- |
| 22 | Disorder | 6.0 |
| 16 | Disorder | 5.4 |

Figure 7:
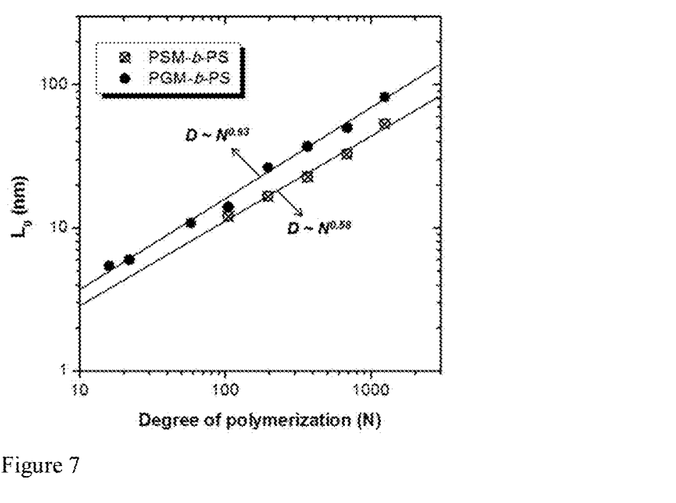
FIG. 7 shows scaling results of PSM-b-PS and PGM-b-PS between the domain spacing ($L_0$) and the degree of polymerization (N). The graph is plotted using a log-log scale.

In the strong segregation regime, Lo for a symmetric BCP varies as $N^{0.6}$, as mentioned above. To identify the scaling exponents (v) of PSM-b-PS and PGM-b-PS copolymers, linear regression analysis was applied to a log-log graph of the $L_0$ versus N, as shown in FIG. 7. Both slopes were found to be v=~0.6, for PGM-b-PS v=0.63 and for PSM-b-PS v=0.58, indicating that both copolymers are in the strong segregation regime. These results also indicate that with PSM-b-PS, it is highly possible to generate lamellar microdomains with dimensions less than 3 nm, which can take nanolithographic templating to a new level.

Gradient Microphase Separated Block Copolymers

Figure 8:
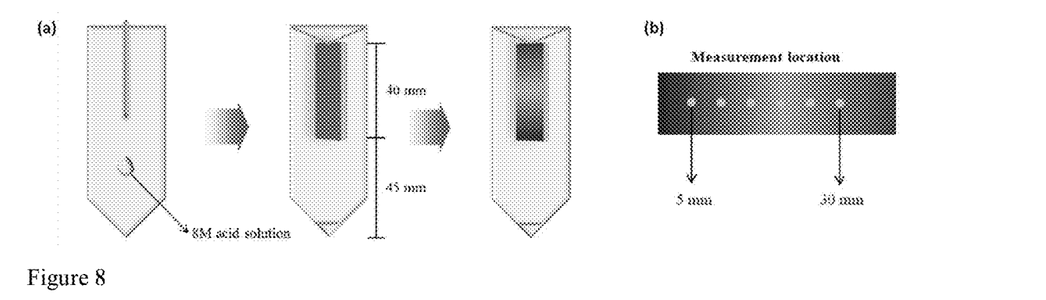
FIG. 8 shows (a) a schematic illustration of an exemplary process for preparing a gradient sample and (b) a schematic illustration of a gradient coated substrate indicating measurement positions from 5 to 30 mm away from the edge of the substrate closest to the acid solution.

As a proof of concept, PSM homopolymer with spin-coated on a substrate, suspended in an open container, and exposed to 8M TFA vapor by addition of 100 microliters of 8M TFA to the bottom of the container in order to provide a gradient coated substrate. A schematic illustration of the setup for this experiment is shown in FIG. 8a. The coated substrate was suspended such that a first edge of the substrate was about 45 mm above the TFA solution. The coated substrate itself had a length of 40 mm. The thickness of the coated film was about 60 nanometers. The coated substrate was exposed to the vapor for reaction times of between 2 and 30 minutes. Measurement points were preselected to be spaced at every 5 mm along the substrate from 5 mm away from the first edge, to 30 mm away from the first edge, as indicated in FIG. 8b.

Figure 9:
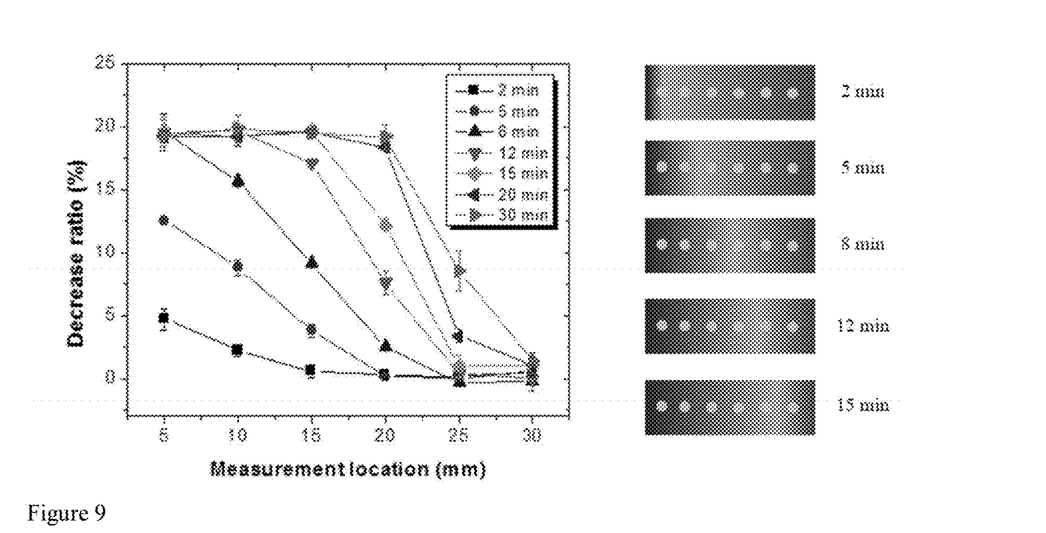
FIG. 9 shows a plot of the thickness change of the coating (expressed as decrease ratio (%)) at the various measurement locations, and also showing how this changes as a function of exposure time.

The change in thickness of the sample, corresponding to the deprotection of the acetal group of PSM to form PGM, was determined at each measurement location after 2, 5, 8, 12, 15, 20 and 30 minutes of exposure time. The maximum decrease in sample thickness, corresponding to 100% conversion of PSM to PGM, was a 20% decrease in thickness (due to an approximately 20% decrease in molecular weight following deprotection). FIG. 9 shows a plot of the percentage of thickness decrease of the sample alone the surface of the substrate from 5 to 30 mm away from the first edge of the substrate, nearest to the bottom of the container holding the TFA solution. From FIG. 9, it is clear that the solid state deprotection reaction of the PSM to PGM by the TFA vapor can provide a gradient across the surface of the substrate, with the particular gradient tunable based on the exposure time of the sample.

The transformation of these films from PSM to PGM offers some unique opportunities. Since the acid vapor enters the film through the surface, there will be a hydrophilic front propagating from the surface of the film towards the substrate. Thus, the film is hydrophilic on the surface but hydrophobic at the substrate. Upon removal of the film from the substrate, exposure of the film to water vapor or an organic vapor will cause preferential swelling if one side of the film, and a bending or curling. For example, a rectangular, planar geometry will cause the film to roll up (i.e., to a cylinder). Different initial geometric shapes, such as squares or triangles, can produce pyramidal shapes.

Figure 10:
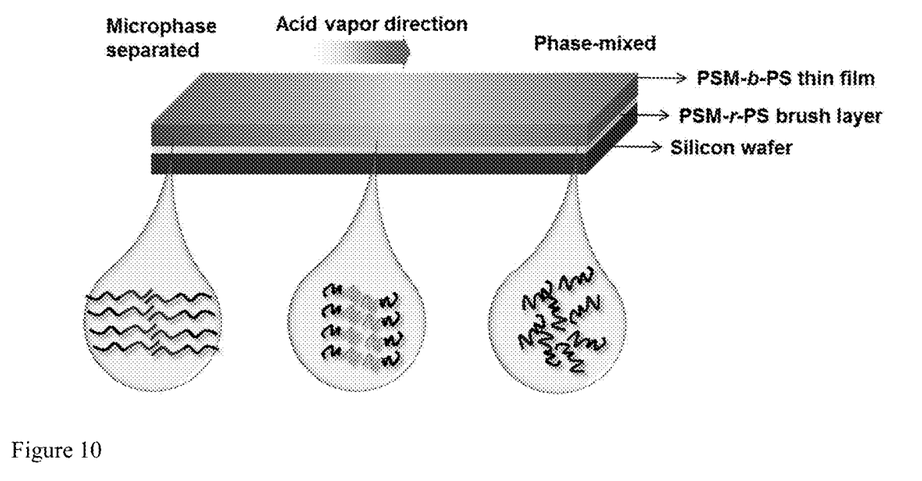
FIG. 10 shows a schematic illustration of a gradient in the conversion of PSM-b-PS to PGM-b-PS, and the resultant gradient in the ordering where one end of the film is phase mixed and the other is microphase separated, in the strong segregation regime.

The initial results obtained for the homopolymer PSM films serve as a foundation for subsequent extension to the PSM-b-PS BCP films, where it is expected that similar gradient PSM deprotection can be achieved, providing a gradient in the amount and intensity of microphase separation as the BCP is transformed to PGM-b-PS. A schematic illustration of this is shown in FIG. 10. A directed flow of acid vapor will be passed over the initially disordered PSM-b-PS films (thin and thick) films from one side of the film. This will produce a gradient in the exposure of the film to acid and, therefore, a gradient in the amount of the PSM-b-PS that is converted to PGM-b-PS. The state of ordering of the BCP varies from being phase mixed to strongly microphase separated, i.e. there is a strong gradient in the ordering across the film. By controlling variables such as the vapor pressure of acid and the exposure time, the magnitude of the gradient will be controlled. In addition, the gradient can be moved across the film by translating the position of the sample at a well-defined rate, so that an ordering front progresses across the surface, promoting long-range lateral ordering of the PGM microdomains.

Also shown in FIG. 10 is the anchoring of a random copolymer (denoted as PSM-r-PS) to the surface of the substrate, where the concentration of the SM and S repeating units is varied to balance interfacial interactions. The PSM-b-PS copolymer can be spin-coated on top of the random copolymer layer. The purpose of the intervening random copolymer layer is to balance the interactions of the PSM and PS blocks with the substrate during the transformation. Specifically, since the BCP is changing from having two hydrophobic blocks to having one hydrophobic block and one hydrophilic block, balancing the interactions of the blocks with the surface presents a challenge. As the acid vapor progresses across the surface converting PSM-b-PS to PGM-b-PS, the underlying random copolymer will similarly be converted to PGM-r-PS. Thus, the balanced interactions of the BCPs with the substrate can be maintained.

In summary, the above examples demonstrate the self-assembly of BCPs into lamellar microstructures with a full pitch of 5.4 nm through ketal hydrolysis of the PSM block in PSM-b-PS to produce PGM-b-PS. SAXS analysis of the self-assembled morphologies showed that exposure of the copolymer to TFA vapor facilitates ketal hydrolysis and can transform a phase-mixed PSM-b-PS into a highly ordered PGM-b-PS in the solid state due to the massive increase in x value. Using a mean-field correlation-hole analysis of the scattering from the copolymer in the phase-mixed state, x for PSM and PS was found to be given by $\chi=0.0196+4.694/T$, ~0.035 at 25° C., which is larger than that of PS-b-PMMA. After transformation, the massive increase in $\chi$ value for PGM-b-PS was found for the lowest molar mass sample as 0.40-0.43 at 25° C. From the log-log plot of the $L_0$ vs. N, the power law exponent for PGM-b-PS was slightly larger than for PSM-b-PS, indicating a slightly larger driving force for the microphase separation. These results indicate that it may be possible to use PSM-b-PS for high-resolution lithography with sub-3 nm features from uniform films cast from a single solvent. Furthermore, additional experiments show that gradient microphase separated BCP samples can also be prepared by this method.

The invention includes at least the following embodiments, which are non-limiting.

Embodiment 1

A method of forming a microphase separated block copolymer, the method comprising: exposing a block copolymer comprising a first hydrophobic block; and a second hydrophobic block, wherein the second hydrophobic block is acid-sensitive; to acid vapor under conditions effective to provide the microphase separated block copolymer comprising domains comprising the first hydrophobic block and domains comprising a hydrophilic block derived from the second hydrophobic block; and thermally annealing the microphase separated block copolymer; wherein the exposing is conducted in the solid state.

Embodiment 2

The method of embodiment 1, wherein the microphase separated block copolymer comprises lamellar microdomains or cylindrical microdomains, preferably wherein the microdomains exhibit a pitch of less than or equal to 6 nanometers.

Embodiment 3

The method of embodiment 1 or 2, wherein the block copolymer is in the form of a bulk sample.

Embodiment 4

The method of embodiment 1 or 2, wherein the block copolymer is in the form of a thin film.

Embodiment 5

The method of any one of embodiments 1 to 4, wherein the first hydrophobic block comprises repeating units derived from a $C_{1-12}$ alkyl (meth)acrylate, a $C_{6-20}$ aryl (meth)acrylate, styrenic monomers, fluorinated monomers, diene monomers, and combinations thereof.

Embodiment 6

The method of any one of embodiments 1 to 5, wherein the first hydrophobic block comprises repeating units derived from styrene.

Embodiment 7

The method of any one or more of embodiments 1 to 6, wherein the second hydrophobic block comprises repeating units according to formula (I), (I)

wherein $R^1$ is independently at each occurrence hydrogen or methyl, X is —O— or —NH—, and $L^1$ is independently at each occurrence a $C_{1-6}$ alkylene group.

Embodiment 8

The method of any one or more of embodiments 1 to 7, wherein the hydrophilic block derived from the hydrophobic block comprises repeating units according to formula (II), (III), or a combination there of (II)

(III)

wherein $R^1$ is independently at each occurrence hydrogen or methyl, X is —O— or —NH—, and $L^1$ is independently at each occurrence a $C_{1-6}$ alkylene group.

Embodiment 9

The method of any one of embodiments 1 to 8, wherein the acid vapor comprises trifluoroacetic acid vapor, hydrochloric acid vapor, trichloroacetic acid, dichloroacetic acid, hydrobromic acid, or combinations thereof.

Embodiment 10

The method of any one of embodiments 1 to 9, wherein the block copolymer has a number average molecular weight of 2,000 to 200,000 grams per mole.

Embodiment 11

The method of any one of embodiments 1 to 10, wherein the block copolymer has a volume fraction of the second hydrophobic block 0.25 to 0.75.

Embodiment 12

The method of any one of embodiments 1 to 11, wherein exposing the block copolymer to the acid vapor is for a time of 1 to 30 minutes.

Embodiment 13

The method of any one of embodiments 1 to 12, wherein thermally annealing the microphase separated block copolymer is at a temperature of 100 to 200° C. for a time of 1 to 24 hours.

Embodiment 14

The method of embodiment 1, wherein the block copolymer is a block copolymer film, and the method comprises: exposing the block copolymer film to acid vapor under conditions effective to provide a gradient microphase separated block copolymer, wherein the gradient microphase separated block copolymer film comprises a first portion adjacent to a first edge of the film, wherein the first portion is substantially microphase separated and comprises domains comprising the first hydrophobic block and domains comprising the hydrophilic block derived from the second hydrophobic block; a gradient portion exhibiting a microphase separation gradient extending from the first portion to a second, opposite edge of the film; and optionally, a second portion, wherein the second portion is substantially phase-mixed and comprises the block copolymer comprising the first hydrophobic block and the second hydrophobic block, provided that when the second portion is present, the second portion is adjacent to the second, opposite edge of the film and the gradient portion extends from the first portion to the second portion; and thermally annealing the microphase separated block copolymer at a temperature of 100 to 200° C. for a time of 1 to 24 hours.

Embodiment 15

The method of embodiment 14, wherein the first portion of the microphase separated block copolymer film comprises lamellar microdomains or cylindrical microdomains, preferably wherein the microdomains exhibit a pitch of less than or equal to 6 nanometers.

Embodiment 16

The method of embodiment 14 or 15, wherein the block copolymer film has a thickness of 10 to 100 nanometers.

Embodiment 17

The method of any one of embodiments 14 to 16, wherein the first hydrophobic block comprises repeating units derived from a $C_{1-12}$ alkyl (meth)acrylate, a $C_{6-20}$ aryl (meth)acrylate, styrenic monomers, fluorinated monomers, diene monomers, and combinations thereof, preferably styrene; the second hydrophobic block comprises repeating units according to formula (I), (II), or a combination thereof (I)

wherein $R^1$ is independently at each occurrence hydrogen or methyl, X is —O— or —NH—, and $L^1$ is independently at each occurrence a $C_{1-6}$ alkylene group; the hydrophilic block derived from the hydrophobic block comprises repeating units according to formula (II), (III), or a combination thereof (II)

(III)

wherein $R^1$ is independently at each occurrence hydrogen or methyl, X is —O— or —NH—, and $L^1$ is independently at each occurrence a $C_{1-6}$ alkylene group; and wherein the acid vapor comprises trifluoroacetic acid vapor.

Embodiment 18

A microphase separated block copolymer, wherein the microphase separated block copolymer comprises a first hydrophobic block and a hydrophilic block having a χN value between the hydrophobic and hydrophilic blocks of greater than 10.5; and wherein the microphase separated block copolymer comprises lamellar or cylindrical microdomains having a pitch of less than or equal to 6 nanometers.

Embodiment 19

The microphase separated block copolymer of embodiment 18, wherein the microphase separated block copolymer is in the form of a thin film.

Embodiment 20

The microphase separated block copolymer of embodiment 18 or 19, wherein the first hydrophobic block comprises repeating units derived from a $C_{1-12}$ alkyl (meth)acrylate, a $C_{6-20}$ aryl (meth)acrylate, styrenic monomers, fluorinated monomers, diene monomers, and combinations thereof, preferably styrene; and the hydrophilic block comprises repeating units according to formula (II), (III), or a combination thereof (II)

(III)

wherein $R^1$ is independently at each occurrence hydrogen or methyl, X is —O— or —NH—, and $L^1$ is independently at each occurrence a $C_{1-6}$ alkylene group.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety, including priority U.S. Provisional Application No. 62/581,198, filed Nov. 3, 2017. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of forming a gradient microphase separated block copolymer film, the method comprising:
   exposing a block copolymer film comprising
      a first hydrophobic block; and
      a second hydrophobic block, wherein the second hydrophobic block is acid-sensitive;
   to acid vapor under conditions effective to provide the gradient microphase separated block copolymer comprising
      a first portion adjacent to a first edge of the film, wherein the first portion is microphase separated and comprises domains comprising the first hydrophobic block and domains comprising a hydrophilic block derived from the second hydrophobic block;
      a gradient portion exhibiting a microphase separation gradient extending from the first portion to a second, opposite edge of the film; and
      optionally, a second portion, wherein the second portion is phase-mixed and comprises the block copolymer comprising the first hydrophobic block and the second hydrophobic block, provided that when the second portion is present, the second portion is adjacent to the second, opposite edge of the film and the gradient portion extends from the first portion to the second portion; and
   thermally annealing the gradient microphase separated block copolymer film;
   wherein the exposing is conducted in the solid state.

2. The method of claim 1, wherein the first portion of the gradient microphase separated block copolymer film comprises lamellar microdomains or cylindrical microdomains.

3. The method of claim 1, wherein the first hydrophobic block comprises repeating units derived from a C$_{1-12}$ alkyl (meth)acrylate, a C$_{6-20}$ aryl (meth)acrylate, styrenic monomers, fluorinated monomers, diene monomers, or combinations thereof.

4. The method of claim 1, wherein the first hydrophobic block comprises repeating units derived from styrene.

5. The method of claim 1, wherein the second hydrophobic block comprises repeating units according to formula (I), wherein R$^1$ is independently at each occurrence hydrogen or methyl, X is —O— or —NH—, and L$^1$ is independently at each occurrence a C$_{1-6}$ alkylene group.

6. The method of claim 1, wherein the hydrophilic block derived from the hydrophobic block comprises repeating units according to formula (II), (III), or a combination thereof (II)

(III)

wherein $R^1$ is independently at each occurrence hydrogen or methyl, X is —O— or —NH—, and $L^1$ is independently at each occurrence a $C_{1-6}$ alkylene group.

7. The method of claim 1, wherein the acid vapor comprises trifluoroacetic acid vapor, hydrochloric acid vapor, trichloroacetic acid, dichloroacetic acid, hydrobromic acid, or combinations thereof.

8. The method of claim 1, wherein the block copolymer has a number average molecular weight of 2,000 to 200,000 grams per mole.

9. The method of claim 1, wherein the block copolymer has a volume fraction of the second hydrophobic block of 0.25 to 0.75.

10. The method of claim 1, wherein exposing the block copolymer to the acid vapor is for a time of 1 to 30 minutes.

11. The method of claim 1, wherein thermally annealing the microphase separated block copolymer is at a temperature of 100 to 200° C. for a time of 1 to 24 hours.

12. The method of claim 1, wherein the block copolymer film is positioned relative to the acid vapor source such that the first edge of the film is a first distance from the acid vapor source, and the second edge is a second distance from the acid Vapor source, wherein the first distance is less than the second distance.

13. The method of claim 12, wherein the first portion of the microphase separated block copolymer film comprises lamellar microdomains or cylindrical microdomains.

14. The method of claim 12, wherein the block copolymer film has a thickness of 10 to 100 nanometers.

15. The method of claim 12, wherein
the first hydrophobic block comprises repeating units derived from a $C_{1-12}$ alkyl (meth)acrylate, a $C_{6-20}$ aryl (meth)acrylate, styrenic monomers, fluorinated monomers, diene monomers, or combinations thereof;
the second hydrophobic block comprises repeating units according to formula (I), (II), or a combination thereof (I)

wherein $R^1$ is independently at each occurrence hydrogen or methyl, X is —O— or —NH—, and $L^1$ is independently at each occurrence a $C_{1-6}$ alkylene group;
the hydrophilic block derived from the hydrophobic block comprises repeating units according to formula (II), (III), or a combination thereof (II)

(III)

wherein $R^1$ is independently at each occurrence hydrogen or methyl, X is —O— or —NH—, and $L^1$ is independently at each occurrence a $C_{1-6}$ alkylene group; and
wherein the acid vapor comprises trifluoroacetic acid vapor.

16. A gradient microphase separated thin film comprising a block copolymer, wherein the thin film comprises
a first portion adjacent to a first edge of the thin film, wherein the first portion is microphase separated and comprises domains comprising a first hydrophobic block and domains comprising a hydrophilic block;
a gradient portion exhibiting a microphase separation gradient extending from the first portion to a second, opposite edge of the film; and
optionally a second portion, wherein the second portion is phase-mixed and comprises the block copolymer comprising the first hydrophobic block and a second hydrophobic block that is acid-sensitive, provided that when the second portion is present, the second portion is adjacent to the second, opposite edge of the film and the gradient portion extends from the first portion to the second portion;
wherein a χN value between the first hydrophobic block and the hydrophilic blocks is greater than 10.5; and
wherein the first portion comprising the microphase separated block copolymer comprises lamellar or cylindrical microdomains having a pitch of less than or equal to 6 nanometers.

17. The gradient microphase separated block copolymer of claim 16, wherein
the first hydrophobic block comprises repeating units derived from a $C_{1-12}$ alkyl (meth)acrylate, a $C_{6-20}$ aryl (meth)acrylate, styrenic monomers, fluorinated monomers, diene monomers, and combinations thereof; and
the hydrophilic block comprises repeating units according to formula (II), (III), or a combination thereof wherein $R^1$ is independently at each occurrence hydrogen or methyl, X is —O— or —NH—, and $L^1$ is independently at each occurrence a $C_{1-6}$ alkylene group.

* * * * *